Patented Sept. 27, 1927.

1,643,698

UNITED STATES PATENT OFFICE.

GEORGE W. COGGESHALL AND ARTHUR REILLY, OF WASHINGTON, DISTRICT OF COLUMBIA, ASSIGNORS TO THE JEFFERSON CONSTRUCTION AND OIL TREATING COMPANY, OF WASHINGTON, DISTRICT OF COLUMBIA, A CORPORATION OF THE DISTRICT OF COLUMBIA.

PROCESS OF SEPARATING OILY EMULSIONS.

No Drawing. Application filed November 10, 1924, Serial No. 749,085. Renewed March 1, 1927.

Our present invention relates to the treatment of petroleum emulsions for the separation thereof into two fractions, namely, a fraction containing the oil content of the emulsions, and a fraction containing the water content of the emulsion, impurities and the like.

In the petroleum industry the oil as taken from the earth contains in many cases a substantial amount of emulsified water, which water is in the form of a relatively permanent emulsion, in which the water and oil do not readily separate. The emulsion in many cases separates from the clear oil and this emulsion is known under various names, it commonly being referred to as "Bottom Settlings" or "B. S."

B. S. is an emulsion which is not readily capable of separation by merely settling and many attempts and many proposals have been made to de-emulsify B. S., in order that the oil content thereof can be separated from the water content and in order to obtain the oil in a sufficiently pure state for sale as crude oil.

Among the various processes which have heretofore been proposed for the treatment of B. S., and similar emulsions, we may mention treatment of heated B. S., with a solution of ordinary soap, followed by settling. Other proposals have been made for the treatment of B. S., or similar emulsions with solutions of various salts. Up to the present time, however, none of the processes heretofore proposed have been found to give entirely satisfactory results.

These petroleum emulsions are of the type where water (or watery solution) is present n tiny droplets in a continuous mass (phase) of oil.

One theory of the stability of these emulsions is that some particular material is present besides water and oil. This material may often be a colloidal material which is present on the interfaces between the water particles and the oil and forms a tough elastic film around each water droplet. It may be (or the tiny water droplet may be) negatively charged but the best opinion is that such electric charge if present does not account for the stability of all B. S. emulsions.

The stabililzing agent or colloid in the film above mentioned, appears to be more easily wetted by oil than by water, or it causes the film to be more easily wetted by oil than by water. In B. S. emulsions this stabilizing agent is believed to be an asphaltic body or hydrated earthy matter which has absorbed an asphaltic body and it must be in an extremely finely divided state to enable it to completely cover all the tiny water droplets.

The surface tension between the emulsifying agent (the stabilizing agent) and the oil is less than between the emulsifying agent and the water. Therefore the oil wets the emulsifying agent more easily than water does.

Anything which tends to make the surface tension between oil and the film greater or which tends to disrupt the film by making the stabilizing agent more soluble in the oil, thereby removing some or all of it from the film, or which tends to make the stabilizing agent flocculate into larger particles thereby not allowing it to completely envelop the tiny water droplets, will tend to decrease the stability of the films and will allow the tiny water droplets to unite to form drops heavy enough to settle to the bottom.

In accordance with the present invention, we have found that with a two-step treatment of the petroleum oil containing emulsified water, first, with a sulfonic acid compound, subsequently with a solution of a salt, (the entire process may or may not be conducted at normal atmospheric temperature, i. e., without heating) a relatively rapid and relatively complete separation of the water from the emulsion can be secured.

The present invention covers a process comprising two separate steps, first a treatment of the emulsion with a sulfo-acid compound (acid or salt), and second, a treatment with a salt solution (alkali metal and alkaline earth metal chloride have proved effective). Salts of alkali metals and salts of alkaline earth metals are hereinafter embraced in the term "salt of an alkali-forming metal."

The effect of the second treatment may be wholly or partly mechanical like a hammer effect; or it may have the effect of making the previously added material, which already has reached the water in the droplets, go out on the surface or film surface and do its work; or it may be wholly or partly that it makes the first added material more thoroughly dispersed so it can unite with and have its effect on the films easier or more thoroughly; or it may render surer or more complete any electrical effects; or it may tend to sweep the tiny freed droplets together; or it may increase any tendency of the first material to flocculate the stabilizing material; or it may have local effects due to the difference in concentrations of salts in the added salt water, and that of salt or salts already in the water in the tiny droplets; or it may be a combination or two or more of these effects.

The materials used in the first step may be (a) sulfo-fatty acids (such for instance as are formed by the process of Twitchell Patent 601,603); (b) aromatic sulfo-fatty acids (such for instance as are formed by the process of Twitchell Patent 628,503); (c) a sulfonic acid of the kind produced by treating petroleum oils with sulfuric acid, in the refining of such oils; or (d) salts of the acids referred to under (a) (b) and (c). Mixtures of two or more of these sulfo-compounds can be used.

One example of this treatment is as follows:

The sulfo-fatty acids, prepared for example according to Patent 601,603, are first mixed with water (preferably soft) one-half to two pounds of the sulfo-fatty acid (e. g., about one pound) being used to two gallons of water. One and one-third gallon of this dilute solution is then added to each barrel of the B. S., thus involving an addition of about two-tenths per cent of the reagent by weight. The mixture is stirred and agitated more or less, or otherwise mixed, preferably by mechanical agitation. The mixture is then treated with the salt solution, the latter comprising (per barrel of oil treated) about three pounds of salt to one and one-half gallons of water, making about one per cent of salt calculated on the oil treated. After or during the addition of the salt solution the mixture is again agitated and then run to settling tanks, where it will be found that a clean separation of water from oil takes place in a relatively short time. The oil above the water will generally be found to contain less than two per cent of water and quite clear.

In carrying out the above examples of the process in the field, the preferred procedure is as follows:

To each barrel (about forty-two gallons) of B. S., there is added six-tenths pounds of the sulfo-fatty acid reagent (which maybe, if desired neutralized with alkali) dissolved or mixed in one gallon of water. This is well agitated for sufficient time to get a thorough mixture, five or ten minutes generally sufficing. A solution of four and one-half pounds of common salt dissolved in two and one-third gallons of water is then added (per barrel of B. S.) and the agitation continued. The mixture is then run to a settling tank, preferably a deep tank, (in which the mixture will be 10 or 15 feet deep) so that better and quicker settling will be effected.

In another example, an aromatic sulfo-fatty acid compound is mixed with water to form a solution or emulsion of say 10% strength. This is then added to the B. S., say one part of the aromatic sulfo-fatty acid to 500 parts of oil, and mixed, then 7½ parts of salt brine of about 20% strength added, and again mixed, and run into a settling tank as above, to settle.

In another example, an aqueous solution or mixture of the sulfonic acids from the acid sludge made by treating petroleum oil or petroleum products with strong sulfuric acid is used. A solution of one part of such sulfonic acids in about 10 parts of water is mixed with about 200 to 1,000 parts of the B. S., then salt brine added as in the previous example, and the mixture then run into a settling tank.

In the agitation steps mechanical agitation is preferred, as it seems to be more efficient and allows the use of smaller tanks, but other agitation, such as by means of compressed air, may be used in place thereof, or the mixed liquids may be forced through a mixing device or pipe, by pressure.

In other cases, the reagent can be first added (in solution or suspension) to the B. S., in the pipe through which the B. S., is being forced into a mixing device, machine or mixing tank. The salt brine can be similarly added and mixed in.

In place of using ordinary settling methods to separate the oil from the residue, centrifuging may be advantageously employed to reduce the time necessary for settling to a minimum.

In the above examples it is recommended that the B. S., and reagents be mixed at atmospheric temperature, there generally being no material advantage by warming or heating. The use of heat, however, is sometimes an aid and its use is a part of our invention.

Kerosene may be used as the vehicle for the sulfo-acid reagent, about 10% solution of the latter in the kerosene being used. The results thus far, when using kerosene, are less satisfactory than when using water. Emulsions of the sulfo-acid reagent with heavy oil, such as cylinder stock, crude oil, etc., have also been experimented with. It is advisable to first dissolve 1% or more of an oil-soluble water-insoluble soap in the oil (e. g. calcium resinate, aluminum stearate etc.), and then emulsify 10% of the reagent therein. This mixture can be used in place of the aqueous solution in the first two examples. The results with such mixtures so far as we have experimented with them, are rather less satisfactory, than with the aqueous solution.

While we have referred herein to the use of salts of the sulfo-acids, of all the kinds referred to, we prefer, in the present two step process, to use the acids themselves rather than the salts. If the salts are used, we may in some cases follow this addition by the addition of a small percentage of an acid, sulfuric of say 10 to 60% or hydrochloric of say 10 to 30% being mentioned as preferable.

The salt brine above referred to, will be added after the acid, in this latter case.

The salt brine may be of the strength stated, or a stronger or weaker brine can be used. The amount of this can be increased to a considerable extent if desired.

The amounts of the reagents as herein set forth are satisfactory, but can be decreased or very greatly increased if desired. If increased, the result is a considerable quicker settlement of the oil and water from the B. S. The use of larger amounts is accordingly recommended when it is desired to get a quicker separation, although the increased cost of reagent is to be considered.

After settling, in all cases, the oil may be drawn off from the upper part of the tank and the water from the lower part of the tank. There may be an intermediate zone of emulsion which can, if it amounts to a substantial fraction of the whole, be run back to the B. S., storage tanks, to be retreated in a subsequent run of the process.

It will be understood, of course, that the several materials or ingredients may be mixed or united in any desired sequence, or all may be mixed together at one and the same time.

We claim:

1. A process of treating petroleum emulsions, which comprises adding and mixing therewith a sulfonated oil materal, adding and mixing therewith a salt solution and subjecting to gravity separation.

2. A process of treating petroleum emulsions, which comprises adding and mixing therewith, a sulfonated oil material, adding and mixing therewith a salt solution, the mixture being in a warmed or heated condition, and subjecting to gravity separation.

3. A process of treating petroleum emulsions, which comprises adding and mixing therewith, a sulfonated oil material, adding and mixing therewith a neutral solution of a soluble salt of an alkali-forming metal and subjecting to gravity separation.

4. A process of treating petroleum emulsions, which comprises adding and mixing therewith a sulfonated oil material, adding and mixing therewith a neutral solution of a salt of an alkali-forming metal, the mixture being in a warmed or heated condition, and subjecting to gravity separation.

In testimony whereof we affix our signatures.

GEORGE W. COGGESHALL.
ARTHUR REILLY.